United States Patent
Kirby (10) Patent No.: US 12,139,808 B2
(45) Date of Patent: Nov. 12, 2024

(54) FORMATION OF A BARRIER COATING USING ELECTROPHORETIC DEPOSITION OF A SLURRY

(71) Applicant: General Electric Company, Schenectady, NY (US)

(72) Inventor: Glen Harold Kirby, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 135 days.

(21) Appl. No.: 17/573,703

(22) Filed: Jan. 12, 2022

(65) Prior Publication Data

US 2023/0220580 A1  Jul. 13, 2023

(51) Int. Cl.
*C25D 13/22* (2006.01)
*C09D 5/44* (2006.01)
*C25D 15/00* (2006.01)

(52) U.S. Cl.
CPC ........... *C25D 13/22* (2013.01); *C09D 5/4419* (2013.01); *C09D 5/4492* (2013.01); *C25D 15/00* (2013.01)

(58) Field of Classification Search
CPC ........ C25D 13/22; C25D 15/00; C25D 13/12; C25D 13/18; C25D 13/02; C25D 13/20; C25D 13/04; C09D 5/4419; C09D 5/4492; C09D 163/00; C09D 175/04; C09D 5/4438; C08G 18/643; C08G 18/8077; C08G 59/4028; C08G 18/8064; F01D 5/288; F01D 5/005; F05D 2230/90; F05D 2230/30; F05D 2230/40; F05D 2220/30; F05D 2300/20; F05D 2300/5023; C09J 5/06; C09J 163/00; C09J 2463/00; C08L 63/00; Y10T 428/31529
See application file for complete search history.

(56) References Cited

U.S. PATENT DOCUMENTS

| | | | |
|---|---|---|---|
| 4,379,869 A * | 4/1983 | Siadat | C09D 5/4407 523/206 |
| 6,025,438 A * | 2/2000 | Hinterwaldner | C09J 5/06 525/530 |
| 6,410,086 B1 | 6/2002 | Brandon et al. | |
| 7,422,671 B2 | 9/2008 | Bhatia et al. | |
| 7,579,087 B2 | 8/2009 | Maloney et al. | |
| 8,529,999 B2 | 9/2013 | Maloney et al. | |
| 9,267,218 B2 | 2/2016 | Luo et al. | |
| 9,713,912 B2 | 7/2017 | Lee | |
| 2006/0029733 A1* | 2/2006 | Bhatia | C04B 41/009 427/458 |
| 2010/0116673 A1* | 5/2010 | Toi | C09D 163/00 205/98 |
| 2016/0160374 A1 | 6/2016 | Antolino et al. | |
| 2016/0348509 A1* | 12/2016 | Malie | C25D 13/02 |
| 2017/0073278 A1 | 3/2017 | Landwehr et al. | |
| 2017/0101348 A1 | 4/2017 | Wan et al. | |
| 2017/0247787 A1 | 8/2017 | Saha et al. | |
| 2018/0029944 A1 | 2/2018 | Subramanian et al. | |

* cited by examiner

*Primary Examiner* — Xiuyu Tai
(74) *Attorney, Agent, or Firm* — Dority & Manning, P.A.

(57) ABSTRACT

Methods are provided for forming a coating on a surface of a substrate. The method may include: applying a negative charge to the surface of the substrate; electrophoretically depositing a slurry layer onto the surface of the substrate; and densifying the slurry layer on the surface of the substrate at a sintering temperature to form a sintered layer of the coating. The slurry layer may include a plurality of EBC material particles, a cationic polyelectrolyte, a plurality of polymeric binder particles, and a solvent. The plurality of EBC material particles may comprise barium strontium aluminosilicate (BSAS), mullite, silicon, rare earth compounds, or combinations thereof.

19 Claims, 2 Drawing Sheets

FORMATION OF A BARRIER COATING USING ELECTROPHORETIC DEPOSITION OF A SLURRY

FIELD

Embodiments of the present disclosure generally relate to environmental barrier coatings for ceramic components (e.g., ceramic matrix composites), along with methods of making the same.

BACKGROUND

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. Still, with many hot gas path components constructed from superalloys, thermal barrier coatings (TBCs) can be utilized to insulate the components and can sustain an appreciable temperature difference between the load-bearing alloys and the coating surface, thus limiting the thermal exposure of the structural component.

While superalloys have found wide use for components used throughout gas turbine engines, and especially in the higher temperature sections, alternative lighter-weight substrate materials have been proposed, such as ceramic matrix composite (CMC) materials. CMC and monolithic ceramic components can be coated with environmental barrier coatings (EBCs) to protect them from the harsh environment of high temperature engine sections. EBCs can provide a dense, hermetic seal against the corrosive gases in the hot combustion environment.

Silicon carbide and silicon nitride ceramics undergo oxidation in dry, high temperature environments. This oxidation produces a passive silicon oxide scale on the surface of the material. In moist, high temperature environments containing water vapor, such as a turbine engine, both oxidation and recession occur due to the formation of the passive silicon oxide scale and subsequent conversion of the silicon oxide to gaseous silicon hydroxide, which results in dimensional loss of the material. For component applications of silicon-based substrates in turbine engines, such material loss can open up clearances and may lead to efficiency losses, and ultimately may lead to perforation of the component.

As such, an environmental barrier coating (EBC) is applied onto the surface of the ceramics to help protect the underlying component. Current materials commonly used for environmental barrier coatings on CMC's include celsian-phase barium strontium aluminosilicate (BSAS) and rare earth silicates. All of these materials are relatively stable in steam compared to the CMC and can prevent penetration of steam to the CMC if present as a dense coating layer.

However, these materials have varying resistance against molten environmental contaminant compositions, particularly those containing oxides of calcium, magnesium, aluminum, silicon, and mixtures thereof. Dirt, ash, and dust ingested by gas turbine engines, for instance, are often made up of such compounds, which often combine to form contaminant compositions comprising mixed calcium-magnesium-aluminum-silicon-oxide systems (Ca—Mg—Al—Si—O), hereafter referred to as "CMAS." At the high turbine operating temperatures, these environmental contaminants can adhere to the hot barrier coating surface, and thus cause damage to the EBC. For example, CMAS can form compositions that are liquid or molten at the operating temperatures of the turbines. The molten CMAS composition can dissolve the barrier coating or can fill its porous structure by infiltrating the pores, channels, cracks, or other cavities in the coating. Upon cooling, the infiltrated CMAS composition solidifies and reduces the coating strain tolerance, thus initiating and propagating cracks that may cause delamination and spalling of the coating material.

In particular, molten dust reacts strongly with BSAS to form a low temperature eutectic and phases that are not stable in steam. Molten dust is less corrosive against rare earth silicates. Some rare earth silicates (e.g., those comprising gadolinium, erbium, and yttrium) react with the molten dust to form highly refractory "apatite" phases. Others rare earth silicates allow CMAS penetration but do not suffer melt point suppression. All rare earth silicates, however, are mechanically weakened by their interaction with molten dust, such that subsequent erosion and impact events can more easily take off the coating.

A need exists, therefore, for improved coating compositions that are less susceptible to molten dust attack, and also less susceptible to subsequent gas erosion, particle erosion, and particle impact over the current state-of-the-art EBC materials.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Repeat use of reference characters in the present specification and drawings is intended to represent the same or analogous features or elements of the present invention.

DEFINITIONS

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, the term "barrier coating(s)" can refer to environmental barrier coatings. The barrier coatings herein may be suitable for application to "components" found in high temperature environments (e.g., operating temperatures of about 2500° C.), such as those present in gas turbine engines. Examples of such components can include, for example, combustor components, turbine blades, shrouds, nozzles, heat shields, and vanes.

As used herein, the term "barrier material" refers to compositions that are useful for forming a layer of a barrier coating on a component, such as a layer of an environmental barrier coating ("EBC"). Barrier materials that are particularly suitable for forming a layer of an EBC may be referred to as "EBC material."

As used herein, ceramic-matrix-composite or "CMC" refers to a class of materials that include a reinforcing material (e.g., reinforcing fibers) surrounded by a ceramic matrix phase.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, a "rare earth" element refers to the elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic" is used herein to mean any material formed from a polymer that softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

The "number average molecular weight" ($M_n$) is readily calculated by one of ordinary skill in the art, and generally refers to the ordinary arithmetic mean or average of the molecular weights of the individual macromolecules. It is determined by measuring the molecular weight of n polymer molecules, summing the weights, and dividing by n, such as represented in the formula:

$$\overline{M}_n = \frac{\sum_i N_i M_i}{\sum_i N_i}$$

where $N_i$ is the number of molecules of molecular weight $M_i$. The number average molecular weight of a polymer can be determined by gel permeation chromatography, viscometry (Mark-Houwink equation), and all colligative methods, like vapor pressure osmometry or end-group determination. Any molecular weights given herein are directed to the number average molecular weight unless otherwise specified.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

An electrophoretic deposition (ED) process is generally provided for forming a coating on a surface of a substrate. ED moves charged particles in a suspension through its liquid carrier (due to an electric field) and deposits the particles on an oppositely charged substrate to form the coating thereon. ED processes may form a coating on a surface of a substrate by building up a uniform thickness layer around a complex component from a suspension of particles within a solvent. However, drying stresses can lead to cracking of the coating when the solvent is evaporated, particularly for thicker coatings. Additionally, such cracks can further open upon heat treatment to yield a coating that is not hermetic to high temperature steam. The present disclosure provides an ED process that, in particular embodiments, inhibits cracking during the formation of the coating such that the resulting ED coating is hermetic to high temperature steam.

In one embodiment, the ED process involves applying a slurry that includes (1) a plurality of EBC material particles, (2) a cationic polyelectrolyte, (3) a plurality of polymeric binder particles (e.g., cationic polymeric binder particles), (4) a solvent, and (5) optional additional components. As explained in greater detail below, other components may also be present in the slurry in certain embodiments, such as a sintering aid. Without wishing to be bound by any particular theory, it is believed that the cationic polyelectrolyte anchors to the EBC material particles to provide the EBC material particles with a long-range positive charge so as to enable their deposition via ED.

I. EBC Material Particles

The EBC material is generally included in the slurry in the form of a plurality of EBC material particles. Ultimately, this EBC material is utilized to form the resulting layer of the barrier coating with the desired properties on the component. In one particular embodiment, the EBC material generally includes an EBC material suitable for formation of a hermetic barrier coating on the surface of the substrate.

In one embodiment, the EBC material particles may have a D50 particle size distribution of 0.2 µm to 2 µm. For example, in one particular embodiment, the EBC material particles may have a D95 particle size distribution of 10 µm to 30 µm. Without wishing to be bound by any particular theories, it is believed that such fine particle size distributions facilitate the interaction between the surfaces of the EBC material particles and the cationic polyelectrolyte for more uniform and efficient electrophoretic deposition, as well as facilitating the sintering process to form a dense layer in a reasonable amount of time (i.e., less than about 24 hours).

For example, the EBC material particles may include barium strontium aluminosilicate (BSAS), mullite, silicon, rare earth compounds, and combinations thereof. The rare earth compounds may include, but are not limited to, rare earth silicates (e.g., mono-silicates and di-silicates), rare earth aluminosilicates, rare earth hafnates, rare earth zirconates, rare earth gallium oxides, rare earth hafnium tantalates, rare earth aluminum hafnium tantalates, etc., or combinations thereof or mixtures thereof.

In one embodiment, the EBC material particles may include a rare earth silicate (e.g., a rare earth monosilicate, a rare earth disilicate, or a combination thereof) as a primary component, with an optional secondary component doped therein. For instance, the EBC material particles can include from 85% to 100% by volume of the rare earth silicate as a primary material and up to 15% by volume of the secondary material. In one embodiment, for instance, the EBC material particles may include 85% to 99% by volume of the rare earth silicate and from 1% to 15% by volume of a secondary material. In another embodiment, the EBC material particles may comprise 100% of the rare earth silicate (e.g., a rare earth monosilicate, a rare earth disilicate, or a combination thereof).

II. Cationic Polyelectrolyte

The cationic polyelectrolyte in the slurry generally transfers a positive charge to the EBC material particles so that the EBC material particles may be deposited via electrophoretic deposition to an anionic-charged substrate (i.e., a negatively charged substrate). Without wishing to be bound by any particular theory, it is believed that the cationic polyelectrolyte coats onto and/or is adsorbed to the surface of the EBC material particles in the slurry so as to create a cationic surface thereon for deposition via a cation ED process. It is also believed that a fraction of the cationic polyelectrolyte also remains free in the slurry (e.g., non-adsorbed to the EBC material particles) once the EBC material particle surface is saturated. Thus, a non-adsorbed fraction of the cationic polyelectrolyte may be included in the deposited slurry layer.

Generally, the cationic polyelectrolyte may be a soluble cationic polyelectrolyte or a latex cationic polyelectrolyte. The term "soluble" refers to compositions that dissolve in the slurry solvent and may have the effect of increasing the viscosity of the slurry. The term "latex" refers to polymer compositions that are suspensions (i.e., solid material dispersed in liquid medium) or emulsions (i.e., liquid droplets that are immiscible yet dispersed in liquid medium).

One particularly suitable cationic polyelectrolyte is a cationic polyelectrolyte based on polyethylenimine (PEI), referred to as a polyethylenimine-based polymer. PEI is a polymer with repeating units composed of an amine group with a two-carbon aliphatic $CH_2CH_2$ spacer. Linear polyethyleneimines contain all secondary amines (e.g., having repeating units of —[$CH_2$—$CH_2$—$NH_2$]—), in contrast to branched PEIs which contain at least one of a primary amino group, a secondary amino group, and/or a tertiary amino group. Additionally, uncharged moieties may be grafted onto either linear or branched PEI to form a copolymer comprising the polyethyleneimine-based polymer and a second polymer. Such groups may include but are not limited to polyethylene oxide, polypropylene oxide, polyvinyl acetate, polyvinyl alcohol, or mixtures or copolymers thereof. The grafted groups may assist in the binding ability of the soluble cationic binder while the PEI assists in the adsorption to EBC material particle surfaces and enabling the ED process.

Typically, high molecular weight linear PEI is solid at room temperature, while branched PEIs are typically liquids at all molecular weights. Substantially all forms of PEI (i.e., linear PEI and branched PEI) are soluble in polar solvents (e.g., water, methanol, ethanol, and/or chloroform) but are generally insoluble in solvents of low polarity (e.g., benzene, ethyl ether, and/or acetone). Thus, PEI is generally considered a soluble cationic polyelectrolyte with a polar solvent (e.g., an aqueous solvent system).

In other embodiments, the cationic polyelectrolyte may be a cationic polyelectrolyte in the form a latex cationic polyelectrolyte. Suitable latex cationic polyelectrolytes may include, but are not limited to, amine-functionalized polystyrene, amine-functionalized emulsion polymers such as those based on acrylic, butadiene-styrene, and natural latex sources, or copolymers thereof, or mixtures thereof. The amine functionalized surface of the latex binders promotes adsorption to the EBC material particle surfaces and enables the ED process. Latex cationic polyelectrolytes are particularly desirable because any fraction that is not adsorbed to the rare earth particles may also participate in deposition via the ED process to assist in supplying significant green strength, along with the polymeric binder particles. As such, latex cationic polyelectrolyte may have an advantage over soluble binders in particular embodiments.

In particular embodiments, the molecular weight of the cationic polyelectrolyte is chosen to be relatively large (e.g., 100,000 grams/mole or greater, 800,000 million grams/mole or greater, such as 800,000 g/mol to 1,500,000 g/mol) to provide the long-range cationic charge that is well beyond the length-scale needed for particle stabilization as known by those skilled in the art of colloid chemistry. Thus, without wishing to be bound by any particular theory, it is believed that the cationic charge provided by the cationic polyelectrolyte on the EBC material particles holds the EBC material particles in place on the oppositely charged substrate during deposition and/or through further processing (e.g., heat treatment).

II. Polymeric Binder Particles

A plurality of polymeric binder particles is included within the slurry to provide crack-free drying behavior and increase the green strength of the electrophoretically deposited layer. In particular embodiments, the plurality of polymeric binder particles includes a thermoplastic binder polymer having a glass transition temperature that is less than the drying temperature, so as to allow for particle deformation during drying to absorb stresses within the coating during drying to inhibit crack formation therein. The polymer binder particle deformation may also provide binding properties to give the dried layer green strength. Thus, the plurality of polymeric binder particles aid in the ability to deposit relatively thick layers of material via ED without cracking, particularly as solvent is removed in subsequent drying steps. Furthermore, the plurality of polymeric binder particles provides green strength to inhibit damage of the electrophoretically deposited layer after drying and before sintering (i.e., a dried layer) during handing or transfer to a furnace.

In certain embodiments, the thermoplastic polymer may have a glass transition temperature of 100° C. or less (e.g., 20° C. to 100° C., such as 25° C. to 85° C.). At such glass transition temperature, the thermoplastic polymer may deform at an elevated drying temperature while the solvent evaporates from the coating so as to inhibit crack formation in the coating. The glass transition temperature ($T_g$) may be determined by dynamic mechanical analysis (DMA) in accordance with ASTM E1640-09. A Q800 instrument from TA Instruments may be used. The experimental runs may be executed in tension/tension geometry, in a temperature sweep mode in the range from −120° C. to 150° C. with a heating rate of 3° C./min. The strain amplitude frequency may be kept constant (2 Hz) during the test. Three (3) independent samples may be tested to get an average glass transition temperature, which is defined by the peak value of the tan δ curve, wherein tan δ is defined as the ratio of the loss modulus to the storage modulus (tan δ=E"/E').

In one particular embodiment, the thermoplastic polymer of the polymeric binder particles may include a cationic moiety (or moieties) on the surface of the polymer binder particles so as to increase the ED efficiency. For example, the thermoplastic polymer may include amine moieties on the surface of the polymer binder particles to give the polymeric binder particles a positive charge. Particularly suitable thermoplastic polymers may include, but are not limited to amine-functionalized polystyrene, amine-functionalized emulsion polymers (such as those based on acrylic, butadiene-styrene, natural latex sources), or copolymers thereof or mixtures thereof.

As used herein, the term "polymeric binder particles" refers to any form of the polymeric binder having some solid state (i.e., not 100% dissolved within a solvent) such as particle form, latex form (e.g., particles in a suspension), etc.

IV. Solvent(s)

The solvent of the slurry may include any fluid material that is sufficient as a carrier fluid for the plurality of EBC material particles, the cationic polyelectrolyte, the plurality of polymeric binder particles, and other components of the slurry. The solvent may be a single type of solvent or a solvent system that includes more than one solvent. For example, the solvent may be a liquid that includes water, an alcohol, an organic solvent, or mixtures thereof. For the ED process, highly polar fluids may be particularly useful as the majority of the total solvent system since electrostatic interactions are long-range in such fluids. Examples of highly polar fluids include, but are not limited to water, tetra-alkyl ammonium chlorides (e.g., tetraethyl ammonium chloride, tetra-propyl ammonium chloride, tetra-pentyl ammonium chloride, and tetra-hexyl ammonium chloride), lower alcohols (e.g., methanol, ethanol, 1-propanol, 2-propanol), dimethyl sulfoxide, dimethylformamide, acetonitrile, benzonitrile, acetic acid, ethylene glycol, propylene glycol, acetone, tetrahydrofuran, and mixtures thereof. Fluid types are also chosen to dissolve polymers that are intended to be dissolved or preserve the solid or emulsion-nature of the polymer where intended.

In one embodiment, the slurry may be relatively dilute so as to ensure sufficient interaction between the EBC material particles having the anchoring cationic polyelectrolyte (positive charge) and the negatively charged substrate. For example, the slurry may have a concentration of the EBC material particles in an amount that is 0.1% to 20% by volume (e.g., 1% to 10% by volume). The slurry may include the cationic polyelectrolyte in an amount of 0.005 cubic centimeters (cc) polyelectrolyte per cc of EBC material particles to 0.05 cc polyelectrolyte per cc of EBC material particles.

V. Sintering Aids and Other Components

Other additives may also be included within the slurry to aid in the ED process and/or during further processing of the layer (e.g., in subsequent heat treatments, etc.).

In one particular embodiments, sintering agents may be including the slurry to facilitate densification of the coating after drying and heat treatment. For example, the sintering aid may lower the temperature required to densify the layer. The densifying temperature may be, with the presence of a sintering aid, 1600° C. or less (e.g., 1300° C. to 1600° C.), 1500° C. or less (e.g., 1300° C. to 1600° C.), or 1450° C. or less (e.g., 1300° C. to 1450° C.).

For example, sintering aids that may be included within the slurry in combination with the EBC material include, but are not limited to silicon or silicon containing compounds (e.g., including but not limited to $SiO_2$, Si-containing organic compounds, preceramic polymers, or resins), aluminum or aluminum containing compounds (e.g., including but not limited to $Al_2O_3$, AlN, aluminum acetate, aluminum nitrate, aluminum carbonate, aluminum containing organometallic compounds), boron or boron containing compounds (e.g., including but not limited to $B_4C$, $B_2O_3$, boric acid, B-containing organic compounds), lithium-containing compounds (e.g., including but not limited to $Li_2O$, $LiCO_3$, lithium-based glass), copper or copper containing compounds (e.g., including but not limited to CuO, $Cu_2O$, copper acetate, copper nitrate, copper carbonate, copper containing organometallic compounds), zinc or zinc containing compounds (e.g., including but not limited to ZnO, zinc acetate, zinc nitrate, zinc carbonate, zinc containing organometallic compounds), iron or iron containing compounds (e.g., including but not limited to $Fe_2O_3$, $Fe_3O_4$, $FeSi_2$, FeSi, iron acetate, iron nitrate, iron carbonate, iron containing organometallic compounds), titanium or titanium containing compounds (e.g., including but not limited to $TiO_2$, TiN, and titanates), gallium or gallium containing compounds (e.g., including but not limited to $Ga_2O_3$, gallates), nickel or nickel containing compounds (e.g., including but not limited to NiO, nickel acetate, nickel nitrate, nickel carbonate, nickel containing organometallic compounds), magnesium containing compounds (e.g., including but not limited to MgO, magnesium acetate, magnesium nitrate, magnesium carbonate, magnesium containing organometallic compounds), cobalt or cobalt containing compounds (e.g., including but not limited to $Co_3O_4$, cobalt acetate, cobalt nitrate, cobalt carbonate, cobalt containing organometallic compounds), or mixtures thereof.

Preferred embodiments contain at least one sintering aid that does not form binary compounds with silicon oxide including copper, gallium, iron, and titanium oxides. This ensures minimal reaction if there is a silicon bond coat in the EBC system.

The weight ratio of sintering aid to the EBC material particles ranges from 0.0001 to 0.1. In another embodiment, the preferred weight ratio of sintering aid to EBC material particles ranges from 0.008 to 0.028.

In one embodiment, the sintering aid may be present in a concentration that results in a sintered layer that leaves only the same phase(s) present as if no sintering aid were used. That is, the sintering aid dissolves into the EBC material particles during sintering and is undetectable in the sintered coating as a separate phase. Alternatively, the sintering aid may be present in an excess concentration that results in a sintered layer having minor amount of a new, sintering-aid rich phase as a separate phase from the EBC material phase, without inhibiting the performance of the sintered coating in terms of steam or CMAS resistance. That is, a majority of the sintering aid dissolves into the material while an excess portion of the sintering aid dissolves into the EBC material particles to form a discrete phase within the sintered layer that is "sintering-aid rich" in that there is an excess of the sintering-aid that is not dissolved within the EBC material particles. For example, a majority (in terms of weight amount) of the sintering aid dissolves into the EBC material particles to form a continuous phase within the sintered layer while an excess portion of the sintering aid dissolves into the EBC material particles to form a discrete sintering aid-rich phase dispersed within the continuous phase.

The slurry composition may also generally include other optional components, such as organic processing aids. As used herein, "organic processing aids" refers to any dispersants, surfactants, plasticizers, additives for controlled dispersion, and/or thickeners, binders present in the slurry. These organic processing aids primarily comprise carbon and other elements that volatilize during processing such that they are not present in the post-sintered coating.

As used herein, "dispersant" refers to compositions selected from the group consisting of polyacrylic acid, polyacrylic acid-polyethylene oxide copolymers, polymethacrylic acid, polyethylenimine, polyvinyl pyrrolidone, ammonium polyacrylate, ammonium polymethacrylate, sulfonated naphthalene formaldehyde condensate, polyvinyl sulfonic acid, and mixtures thereof. It is noted that when utilized as the cationic polyelectrolyte, polyethyleneimine may also serve as a dispersant of the solid particles in the slurry. Also, when a different cationic polyelectrolyte is utilized, then a polyethyleneimine may be utilized as a dispersant in the slurry. For example, PEIs with high molecular weight (e.g., greater than 100,000 g/mole, 800,000 g/mol or greater, such as 800,000 g/mol to 1,500,000 g/mol) are particularly suitable as a dispersant for EBC material particles and sintering aids used in the ED slurries because of their cationic charging behavior having a long range of the charge due to the high molecular weight.

As used herein, "plasticizer" refers to compositions selected from the group consisting of ethylene glycol, diethylene glycol, triethylene glycol, tetraethylene glycol glycerol, glycerin, glycerol, polyethylene glycol, diethylene glycol monobutyl ether, dibutyl phthalate, di(propylene glycol) dibenzoate, and mixtures thereof.

As used herein, "surfactant" refers to compositions selected from the group consisting of fluorocarbons, dimethylsilicones, acetylenic glycol chemistries (e.g., commercial surfactants in the Surfynol® series (Air Products and Chemicals, Inc.)), and mixtures thereof. Surfactants are often used to reduce or eliminate foam in a slurry. Such surfactants have limited use in an ED slurry but may prevent foam from gathering on a component extracted from an ED slurry bath.

As used herein, "additive for controlled dispersion" refers to compositions selected from the group consisting of citric acid, glycine, dextrose, sucrose, mannose, tartaric acid, oxalic acid, and mixtures thereof. These compounds may limit the partial dissolution (leaching) of rare earths into aqueous slurry. Furthermore, these compounds may form stable, dissolved, complexes with the rare earth ions (e.g., $Y^{3+}$, $Yb^{3+}$, $Lu^{3+}$) to prevent them from forming hydroxides (e.g., $Y(OH)_3$, $Yb(OH)_3$, $Lu(OH)_3$) or carbonates (e.g., $Y_2(CO_3)_3$, $Yb_2(CO_3)_3$, $Lu_2(CO_3)_3$) that precipitate in the slurry. The precipitation of these compounds may change the deposition behavior in the ED process.

In one embodiment, the slurry can be formed by combining the plurality of EBC material particles, the plurality of polymeric binder particles, the solvent, and any optional additional components, along with any mixing media, in a container. Then, the combined materials may be mixed for 3 hours to 15 hours. The mixture can be mixed using conventional techniques known to those skilled in the art such as shaking with up to a 1 mm to 6.35 mm diameter alumina or zirconia mixing media, ball milling using a diameter of 6.35 mm to 25.4 mm alumina or zirconia mixing media, attritor milling using a 1 mm to a 5 mm diameter zirconia-based mixing media, planetary ball milling using from a 1 mm to a 5 mm diameter zirconia-based media, or mechanical mixing or stirring with simultaneous application of ultrasonic energy. The mixing media or ultrasonic energy can break apart any agglomerated particles in the slurry, particularly agglomerated EBC material particles. Any mixing media present may subsequently be removed by straining, for example. The cationic polyelectrolyte can then be added with the other components or after mixing of the other components. When added later, the slurry may be mixed again with mild to rigorous agitation depending on the balance to achieve homogeneity quickly (e.g., by dissolving the soluble cationic polyelectrolyte or dispersing the latex cationic polyelectrolyte) versus the prevention of foam or air entrainment into the slurry. Optionally, surfactants can be used to defoam the slurry if the mixing is too rigorous and a large amount of foam is generated; however, this is more the case in aqueous suspensions than solvent based. Once the slurry is homogeneous, it is ready for use.

Those skilled in the art will understand that the previous embodiment is one method for making the slurry compositions described herein, and that other methods are also acceptable.

VI. ED Process

The electrophoretic deposition process may be utilized to form a barrier coating (e.g., a hermetic coating) suitable for use in an environmental barrier coating (EBC) on a substrate, such as for use in conjunction with CMCs or monolithic ceramics. Some examples of CMCs acceptable for use herein can include, but should not be limited to, materials having a matrix and reinforcing fibers comprising silicon carbide, silicon nitride, and mixtures thereof.

For the ED process, a negative charge may be applied to the surface of the substrate. For example, the negative charge is applied to the substrate by setting up an electrolytic cell and applying an electric field.

In one embodiment, the substrate may have a bond coat on its surface. For example, a silicon-based substrate may include a bond coat of silicon. In such embodiments, the bond coat is generally conductive to allow for its use as a cathode in the ED process. For example, the EBC material particles coated with a cationic polyelectrolyte may be deposited onto a silicon bond coat over the substrates via cathodic deposition where the substrate (e.g., the conductive silicon-coated substrate) is the cathode (i.e., negatively charged). The positively charged anode is a conductive surface that is roughly conformal to the shape of the component but is separated from the surface of the substrate cathode to set-up the electric field. The slurry resides between the anode and the cathode, and once the electric field is applied, positively charged particles are deposited onto the negatively charged substrate cathode surface in the ED process.

When substrates have complex geometry, such as an airfoil engine component, the anode design also increases in complexity to set up the conformal gap. The strength of the electric field may also be modified around the electrolytic cell to control local deposition rates, or even the overall deposition rate. Areas of varying thickness can be created by modifying the strength of the electric field in various regions. The strength of the electric field can be modified by physically changing the anode design or by adjusting the current and voltage.

As such, the slurry may be utilized to form a barrier coating, such as a hermetic layer that includes the EBC material. The slurry ED process may include one or more cycles that include slurry formation, electrophoretic deposition, drying, and sintering, with optional masking, sintering aid infiltration, mask removal, and organic processing aid burnout steps.

For instance, the drying of the slurry layer may be performed to remove substantially all of the solvent from the layer. Drying may be carried out in ambient or controlled temperature and humidity conditions. In one embodiment, controlled temperature and humidity can be utilized to help maintain the integrity of the applied slurry coating. More particularly, in one embodiment, drying may be carried out at a drying temperature that is greater than the glass transition temperature of the polymeric binder particles. Thus, the glass transition temperature of the polymeric binder particles is less than the drying temperature to keep the polymeric binder generally amorphous allowing it to deform during drying to inhibit crack formation within the layer. For example, the drying temperature may be 100° C. or less, such as a drying temperature of 15° C. to 85° C., and in another embodiment, from 20° C. to 30° C. In certain embodiments, the drying environment may comprise from 10% relative humidity to 95% relative humidity, in one embodiment from 50% relative humidity to 90% relative humidity, and in yet another embodiment from 70% relative humidity to 80% relative humidity. In yet another embodiment, drying can be accelerated using a vacuum or partial vacuum.

Figure 1:
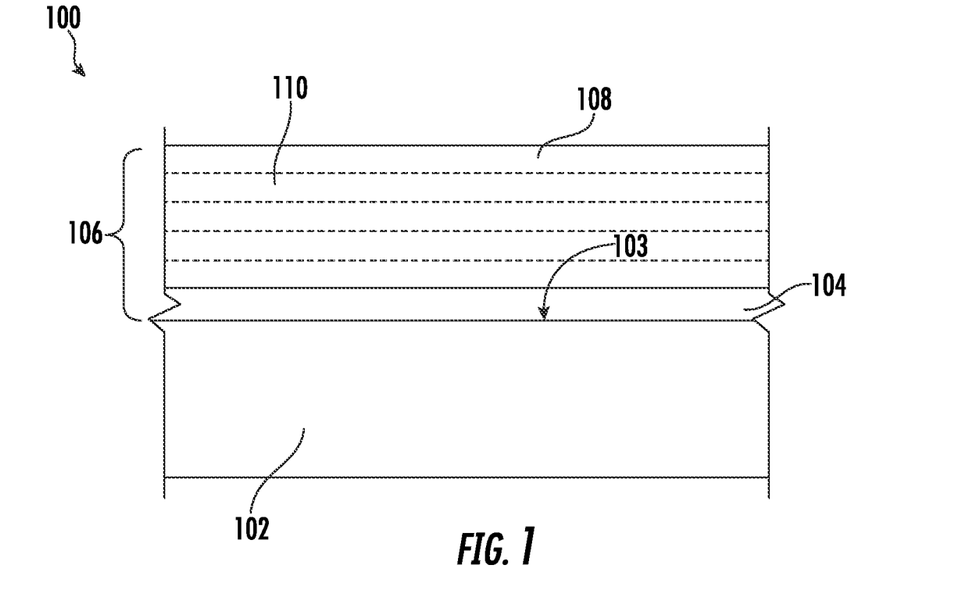
FIG. 1 shows an exemplary coated component having a substrate with a coating system thereon.

Referring now to the drawings, FIG. 1 shows an exemplary coated component 100 with a substrate 102 having a coating system 106 thereon formed using the ED process. Generally, the coating system 106 includes an optional bond coating 104 on the surface 103 of the substrate and an EBC 108 on the optional bond coating 104.

Figure 2:
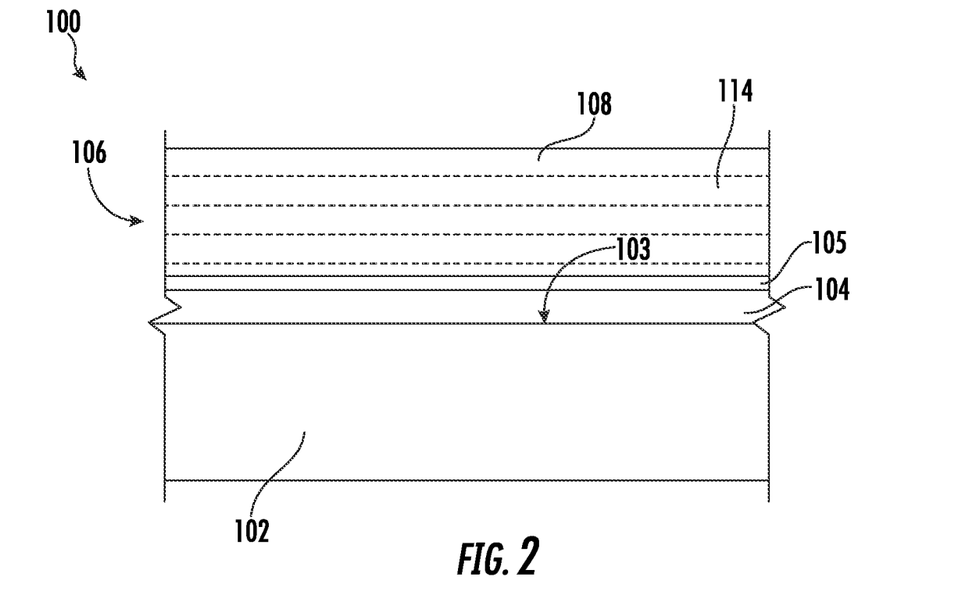
FIG. 2 shows an exemplary coated component having a substrate with a coating system thereon.

In the embodiment shown, the bond coating 104 is directly on the surface 103 without any layer therebetween. However, in other embodiments, one or more layers can be positioned between the bond coating 104, when present, and the surface 103. In other embodiments, the EBC 108 may be formed directly on the surface 103 of the substrate 102. FIG. 2 shows a thermally grown oxide ("TGO") layer 105, which may form on the surface of the silicon-based bond coating 104, such as a layer of silicon oxide (sometimes referred to as "silicon oxide scale" or "silica scale"), during exposure to oxygen (e.g., during manufacturing and/or use) of the component 100.

As stated above, the EBC material particles have a composition that may form a layer 110 of an EBC 108 of the coating system 106 so as to provide a material having minimal reaction with CMAS and having high hardness (e.g., for erosion resistance) after reaction with CMAS. In one embodiment, a layer 110 may have a thickness of 1 µm to 1 mm (e.g., 1 µm to 500 µm).

If desired, masking can be applied to the ceramic component before the slurry is applied to prevent coating specific areas of the component. Masking may be accomplished using conventional techniques known to those skilled in the art including, but not limited to, tapes, tooling, and paint-on adhesives.

After drying, any masking present may be removed by peeling off tapes and adhesives, pyrolysis of tapes and adhesives, or by removing multi-use tooling. Any rough edges remaining after masking removal may be scraped or cut away using conventional means.

Next, burnout of the organic materials (e.g., the cationic polyelectrolyte, the polymeric binder, and other organic processing aids) may be carried out by heating the dried, coated substrate to a burnout temperature. For example, the dried component may be placed in an elevated temperature environment (e.g., at a burnout temperature) so that any residual water or solvent can be evaporated, and the organic material can be pyrolyzed. In one embodiment, burnout of the organic material may be accomplished by heating the dried component at a rate of from 1° C./min to 15° C./min to a burnout temperature of from 400° C. to 1000° C. The dried component may be held at this burnout temperature for up to 2 hours. In another embodiment, the coated component may be heated at a rate of from 2° C./min to 6° C./min to a temperature of from 600° C. to 800° C. and holding the component at this temperature for up to 2 hours. In another embodiment, the hold time can be eliminated by slowly ramping up to the target temperature without holding, followed by ramping up or down to another temperature at a different rate. In another embodiment, burnout can occur rapidly by placing the coated component into a furnace heated to a temperature of from 400° C. to 1400° C.

The dried component may then be sintered to produce a component having a barrier layer of an environmental barrier coating thereon. Sintering can serve to simultaneously densify and impart strength to the coating. Additionally, sintering can impart a hermetic seal against high temperature steam present in the engine environment. Sintering can be carried out using a conventional furnace, or by using such methods as microwave sintering, laser sintering, infrared sintering, and the like.

Sintering can be accomplished by heating the dried component at a rate of from 1° C./min to 15° C./min to a temperature of from 1100° C. to 1700° C. and holding the component at that temperature for from 0 to 24 hours. In another embodiment, sintering can be accomplished by heating the coated component at a rate of from 5° C./min to 15° C./min to a sintering temperature, such as described above, and holding the component at that temperature for from 0 to 24 hours. In one particular embodiment, the sintering temperature may be 1300° C. to 1600° C., such as 1300° C. to 1375° C.

Alternately, in another embodiment, binder burnout and sintering can be carried out in a single process by heating at a rate of 1° C./minute to 15° C./minute to the burnout temperature (e.g., 400° C. to 1000° C. as described above) and holding at this temperature for from 0 to 2 hours. The component can then be heated at a rate of from 1° C./minute to 15° C./minute from the binder burnout temperature to the sintering temperature (e.g., 1100° C. to 1700° C. as described above) and holding at his temperature for from 0 to 24 hours, as set forth in the Examples below.

The average thickness per slurry deposition cycle depends primarily on the electrophoretic deposition parameters including the strength of the electric field per anode design, the strength of the electric field per applied current and voltage, and the time that the current and voltage is applied during application. Characteristics of the formed slurry, such as the solids loading, solvent type, and cationic polymer dispersant molecular weight, also impact the average thickness per deposition cycle.

Additional cycles can be pursued to build up additional thickness, but an issue with surface conductivity must be overcome. Once a pass of material is sintered onto the substrate, the surface is no longer conductive and thus cannot support additional electrophoretic deposition. To overcome this situation, a thin (e.g., 1 nm to 1000 nm, such as 1 nm to 500 nm), conductive layer can be applied to the surface to allow for additional cycles of electrophoretic deposition. Conductive layers include but are not limited to graphene, silicon, nickel, chrome, and iron.

The conductive layers may be applied by techniques such as chemical vapor deposition, physical vapor deposition, sputtering, electroless plating, and slurry deposition via spraying, dipping, rolling, painting, stamping, etc. For example, a conductive silicon layer may be applied by chemical vapor deposition; a conductive silicon or graphene layer may be applied by slurry deposition; or a conductive nickel, chrome, or iron layer may be deposited by electroless plating.

Once the surface is made conductive again, another pass of material can be electrophoretically deposited, dried, and sintered. In such embodiments, the conductive layer is so thin that it is consumed in the sintering process such that it either diffuses into the deposited barrier layer (e.g., in the case of silicon, iron, chrome, or nickel) or burns away without leaving an air gap (e.g., in the case of graphene).

Figure 3A:
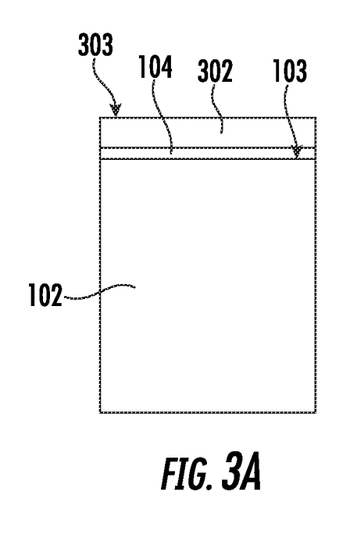
FIG. 3A shows a first sintered layer formed over a bond coating on a substrate.
Figure 3B:
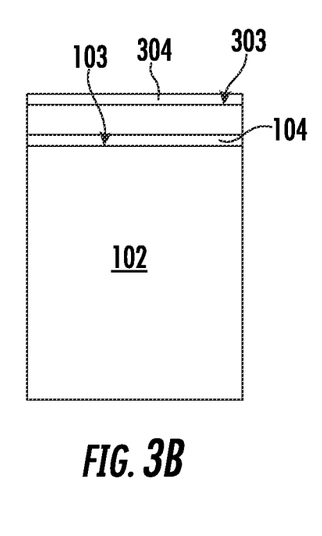
FIG. 3B shows a conductive layer formed over the first sintered layer of FIG. 3A.
Figure 3C:
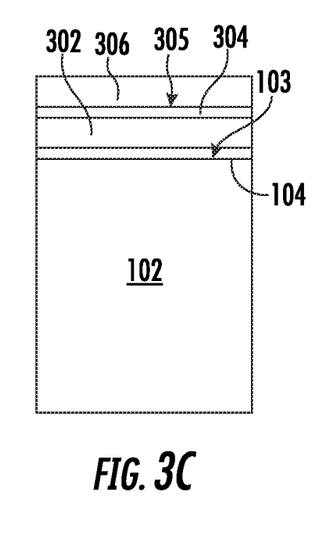
FIG. 3C shows a second slurry layer formed over the conductive layer FIG. 3B.
Figure 3D:
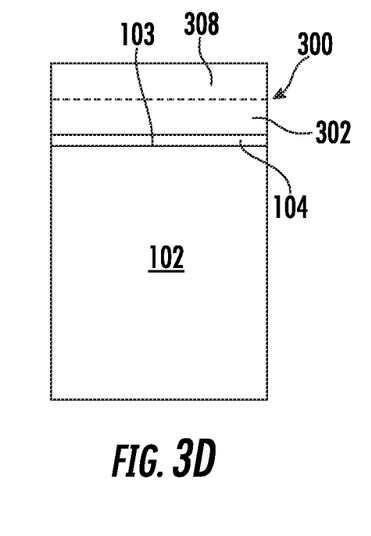
FIG. 3D shows a multilayered coating formed from the first sintered layer of FIG. 3A and the sintering of the second slurry layer of FIG. 3C.

Referring to FIG. 3A-3D, an exemplary multilayered coating 300 is shown being formed through a sequential deposition of slurry layers, sintering to form sintered layers, and deposition of conductive layers. In the exemplary embodiment, FIG. 3A shows a sintered layer 302 over a bond coating 104 on the surface 103 of the substrate 102, which can be formed according to the ED process described above (e.g., utilizing the ED of a slurry to form a slurry layer, drying the slurry layer to form a dried layer, and sintering the dried layer to form the sintered layer 302). FIG. 3B shows the formation of a conductive layer 304 on the surface 303 of the sintered layer 302, which can be formed as described above to be a relatively thin layer. FIG. 3C shows the formation of a second slurry layer 306 on the surface 305 of the conductive layer 304, which can be formed according to the ED process described above (e.g., utilizing the ED of a slurry to form the second slurry layer 306 and optionally drying the slurry layer to form a dried layer). FIG. 3D shows a multilayered coating 300 formed after sintering of the second slurry layer 306 at a sintering temperature (as described above) such that a second sintered layer 308 is formed and the conductive layer 304 is consumed (e.g., diffused into the sintered layers 302 and/or 308 and/or burned out of the coating 300). Thus, the first sintered layer 302 and the second sintered layer 308 are essentially merged together to form a multilayer coating. This process may be repeated as desired to form a multilayered coating 300 with the desired thickness on the substrate 102.

In one embodiment, the optional sintering aid is added to at least one of the slurry layers 302, 306 but does not need to be added directly to every slurry layer to achieve the desired result. For example, an electrophoretically deposited layer with no sintering aid can be densified by applying the layer, allowing it to dry, and then back infiltrating a sol-gel solution comprised of a water soluble or solvent soluble sintering aid prior to heat treatment.

In one embodiment, the ED process may be used to form an outermost layer of the EBC 108 of the coating system 106, such that the coating may help protect any underlying EBC layers, the underlying bond coating 104, and the substrate 102.

As stated, the substrate 102 may be a CMC substrate. As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The EBC 108 may include any combination of one or more layers 110 formed from materials selected from typical EBC or thermal barrier coating ("TBC") layer chemistries, including but not limited to rare earth silicates (e.g., monosilicates and di-silicates), aluminosilicates (e.g., mullite, barium strontium aluminosilicate (BSAS), rare earth aluminosilicates, etc.), hafnia, zirconia, stabilized hafnia, stabilized zirconia, rare earth hafnates, rare earth zirconates, rare earth gallium oxide, etc. Any or all of the layers 110 may be formed according to the ED processes described herein.

When present, the bond coating 104 includes silicon or a silicon-based material (e.g., a silicide, etc.). Generally, the bond coating 104 is relatively thin, such as having a thickness that is 25 micrometers (μm) to 275 μm, such as 25 μm to 150 μm (e.g., 25 μm to 100). It is desirable to have a continuous layer of silicon bond coat on top of these substrates to provide the necessary conductivity for electrophoretic deposition, and in the case of silicon carbide-based CMC, to also act as the silicon bond coat.

The coated component 100 of FIG. 1 is particularly suitable for use as a component found in high temperature environments, such as those present in gas turbine engines, for example, combustor components, turbine blades, shrouds, nozzles, heat shields, and vanes. In particular, the turbine component can be a CMC component positioned within a hot gas flow path of the gas turbine such that the coating system 106 forms an environmental barrier for the underlying substrate 102 to protect the component 100 within the gas turbine when exposed to the hot gas flow path.

Further aspects of the invention are provided by the subject matter of the following clauses:

A method of forming a coating on a surface of a substrate, the method comprising: (a) applying a negative charge to the surface of the substrate; (b) electrophoretically depositing a slurry layer onto the surface of the substrate, wherein the slurry layer comprises a plurality of EBC material particles, a cationic polyelectrolyte, a plurality of polymeric binder particles, and a solvent; and (c) densifying the slurry layer on the surface of the substrate at a sintering temperature to form a sintered layer of the coating.

The method of any preceding clause, wherein the plurality of EBC material particles comprise barium strontium aluminosilicate (BSAS), mullite, silicon, rare earth compounds, or combinations thereof.

The method of any preceding clause, wherein the plurality of EBC material particles comprise rare earth compounds selected from the group consisting of rare earth silicates, rare earth aluminosilicates, rare earth hafnates, rare earth zirconates, rare earth gallium oxides, rare earth hafnium tantalates, rare earth aluminum hafnium tantalates, and mixtures thereof.

The method of any preceding clause, wherein the cationic polyelectrolyte comprises a polyethylenimine-based polymer.

The method of any preceding clause, wherein the cationic polyelectrolyte comprises a copolymer comprised of a polyethyleneimine-based polymer and a second polymer.

The method of any preceding clause, wherein the second polymer comprises polyethylene oxide, polypropylene oxide, polyvinyl acetate, polyvinyl alcohol, or mixtures or copolymers thereof.

The method of any preceding clause, wherein the cationic polyelectrolyte comprises a latex cationic polyelectrolyte.

The method of any preceding clause, wherein the cationic polyelectrolyte has a molecular weight that of 100,000 grams/mole or greater.

The method of any preceding clause, wherein the EBC material particles are fully saturated on their respective surfaces by the cationic polyelectrolyte such that a non-adsorbed fraction of the cationic polyelectrolyte is electrophoretically deposited into the slurry layer.

The method of any preceding clause, wherein the plurality of polymeric binder particles comprises a thermoplastic polymer having a glass transition temperature of 20° C. to 100° C.

The method of any preceding clause, wherein the thermoplastic polymer includes a cationic moiety on the surfaces of the plurality of polymer binder particles.

The method of any preceding clause, wherein the slurry layer further comprises a sintering aid.

The method of any preceding clause, wherein the sintering temperature is 1300° C. to 1600° C.

The method of any preceding clause, further comprising: after electrophoretically depositing a slurry layer onto the surface of the substrate and prior to densifying the slurry layer, drying the slurry layer at a drying temperature that is less than the sintering temperature to form a dried layer.

The method of any preceding clause, wherein the drying temperature is 15° C. to 85° C.

The method of any preceding clause, wherein the substrate is a ceramic matrix composite, and wherein a bond coating is present on the surface of the substrate such that the negative charge is applied to the bond coating and the slurry layer is electrophoretically deposited onto the bond coating.

The method of any preceding clause, further comprising, after densifying the slurry layer to form the sintered layer: (d) forming a conductive layer on the sintered layer; (e) applying a negative charge to the conductive layer; (f) electrophoretically depositing a second slurry layer onto the conductive layer, wherein the second slurry layer comprises a second plurality of EBC material particles, a second cationic polyelectrolyte, a second plurality of polymeric binder particles, and a second solvent; (g) densifying the second slurry layer on the conductive layer at a sintering temperature to form a second sintered layer and to consume the conductive layer; and (h) repeating (d) through (g) to form a multilayered coating on the substrate.

The method of any preceding clause, wherein the conductive layer has a thickness of 1 nm to 1000 nm, and wherein the conductive layer comprises silicon, graphene, nickel, chrome, or iron.

A coated component formed by the method of any preceding clause.

A slurry for forming a coating on a surface of a substrate by the method of any preceding clause.

A slurry for forming a coating on a surface of a substrate, the slurry comprising: a plurality of EBC material particles, a cationic polyelectrolyte, a plurality of polymeric binder particles, and a solvent.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a coating on a surface of a substrate, the method comprising:
    (a) applying a negative charge to the surface of the substrate;
    (b) electrophoretically depositing a slurry layer onto the surface of the substrate, wherein the slurry layer comprises a plurality of environmental barrier coating (EBC) material particles, a cationic polyelectrolyte, a plurality of cationic thermoplastic polymeric binder particles, and a solvent; and
    (c) densifying the slurry layer on the surface of the substrate at a sintering temperature to form a sintered layer of the coating,
    wherein the plurality of cationic thermoplastic polymeric binder particles are suspended in the solvent.

2. The method of claim 1, wherein the plurality of EBC material particles comprise barium strontium aluminosilicate (BSAS), mullite, silicon, rare earth compounds, or combinations thereof.

3. The method of claim 1, wherein the plurality of EBC material particles comprise rare earth compounds selected from the group consisting of rare earth silicates, rare earth aluminosilicates, rare earth hafnates, rare earth zirconates, rare earth gallium oxides, rare earth hafnium tantalates, rare earth aluminum hafnium tantalates, and mixtures thereof.

4. The method of claim 1, wherein the cationic polyelectrolyte comprises a polyethylenimine-based polymer.

5. The method of claim 4, wherein the cationic polyelectrolyte comprises a copolymer comprised of a polyethyleneimine-based polymer and a second polymer.

6. The method of claim 5, wherein the second polymer comprises polyethylene oxide, polypropylene oxide, polyvinyl acetate, polyvinyl alcohol, or mixtures or copolymers thereof.

7. The method of claim 1, wherein the cationic polyelectrolyte comprises a latex cationic polyelectrolyte.

8. The method of claim 1, wherein the cationic polyelectrolyte has a molecular weight that of 100,000 grams/mole or greater.

9. The method of claim 1, wherein the EBC material particles are fully saturated on their respective surfaces by the cationic polyelectrolyte such that a non-adsorbed fraction of the cationic polyelectrolyte is electrophoretically deposited into the slurry layer.

10. The method of claim 1, wherein the plurality of cationic thermoplastic polymeric binder particles comprises a thermoplastic polymer having a glass transition temperature of 20° C. to 100° C.

11. The method of claim 10, wherein the plurality of cationic thermoplastic polymer binder particles define respective surfaces thereon, and wherein the thermoplastic polymer includes a cationic moiety on the respective surfaces of the plurality of cationic thermoplastic polymer binder particles.

12. The method of claim 1, wherein the slurry layer further comprises a sintering aid.

13. The method of claim 1, wherein the sintering temperature is 1300° C. to 1600° C.

14. The method of claim 1, further comprising:
after electrophoretically depositing the slurry layer onto the surface of the substrate and prior to densifying the slurry layer, drying the slurry layer at a drying temperature that is less than the sintering temperature to form a dried layer.

15. The method of claim 14, wherein the drying temperature is 15° C. to 85° C.

16. The method of claim 1, wherein the substrate is a ceramic matrix composite, and wherein a bond coating is present on the surface of the substrate such that the negative charge is applied to the bond coating and the slurry layer is electrophoretically deposited onto the bond coating.

17. The method of claim 1, further comprising, after densifying the slurry layer to form the sintered layer:
(d) forming a conductive layer on the sintered layer;
(e) applying a negative charge to the conductive layer;
(f) electrophoretically depositing a second slurry layer onto the conductive layer, wherein the second slurry layer comprises a second plurality of EBC material particles, a second cationic polyelectrolyte, a second plurality of cationic thermoplastic polymeric binder particles, and a second solvent;
(g) densifying the second slurry layer on the conductive layer at a sintering temperature to form a second sintered layer and to consume the conductive layer; and
(h) repeating (d) through (g) to form a multilayered coating on the substrate.

18. The method of claim 17, wherein the conductive layer has a thickness of 1 nm to 1000 nm, and wherein the conductive layer comprises silicon, graphene, nickel, chrome, or iron.

19. A coated component formed by the method of claim 1.

* * * * *